United States Patent
Burkholder et al.

(10) Patent No.: US 7,132,481 B2
(45) Date of Patent: Nov. 7, 2006

(54) COMPOSITE OF MELAMINE DERIVATIVE AND CARBON BLACK, RUBBER COMPOSITION AND ARTICLE HAVING A COMPONENT THEREOF

(75) Inventors: Karen Elaine Burkholder, Wadsworth, OH (US); Kristine Nicole Ludwig, Akron, OH (US); James Robert Tuttle, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 381 days.

(21) Appl. No.: 10/409,459

(22) Filed: Apr. 8, 2003

(65) Prior Publication Data

US 2003/0213540 A1 Nov. 20, 2003

Related U.S. Application Data

(60) Provisional application No. 60/381,232, filed on May 17, 2002.

(51) Int. Cl.
- C08F 3/34 (2006.01)
- C08C 19/00 (2006.01)
- C08K 9/00 (2006.01)
- C08K 3/04 (2006.01)

(52) U.S. Cl. .............. 525/332.6; 525/332.5; 525/332.7; 523/215; 524/495

(58) Field of Classification Search ........ 524/495, 524/496; 525/332.6, 332.5, 332.8, 332.9, 525/333.1, 333.3
See application file for complete search history.

(56) References Cited

U.S. PATENT DOCUMENTS

| | | | |
|---|---|---|---|
| 3,517,722 A | 6/1970 | Endter et al. | 152/359 |
| 3,522,127 A | 7/1970 | Osborne et al. | 156/334 |
| 3,975,296 A | 8/1976 | Kaplan | 252/383 |
| 4,338,263 A | 7/1982 | Elmer | 260/762 |
| 4,339,359 A | 7/1982 | Bezwada | 524/512 |
| 4,436,853 A | 3/1984 | Schloman | 524/91 |
| 4,605,696 A | 8/1986 | Benko et al. | 524/432 |
| 5,194,513 A | 3/1993 | Wideman et al. | 525/329.3 |
| 5,206,289 A | 4/1993 | Sinsky et al. | 525/114 |
| 5,723,523 A * | 3/1998 | Engelhardt et al. | 524/100 |
| 6,053,226 A | 4/2000 | Agostini | 152/209.5 |
| 6,138,731 A | 10/2000 | Miyazaki et al. | 152/532 |
| 6,269,858 B1 | 8/2001 | Sandstrom | 152/547 |
| 6,884,832 B1 * | 4/2005 | Wentworth et al. | 524/306 |

FOREIGN PATENT DOCUMENTS

EP 1191057 3/2002

OTHER PUBLICATIONS

Abstract XP-002245993 from Database WPI, Section Ch. Week 199320, Derwent Publications Ltd., for Japanese patent 05098081 of Apr. 20, 1993.
European Search Report.

* cited by examiner

*Primary Examiner*—Tae H. Yoon
(74) *Attorney, Agent, or Firm*—Henry C. Young, Jr.

(57) ABSTRACT

This invention relates to a composite of a melamine derivative, particularly a liquid melamine derivative, and carbon black. A representative melamine derivative is, for example, comprised of an alkoxymethylmelamine such as hexamethoxymethylmelamine. The invention further relates to a rubber composition containing such composite of a melamine derivative and carbon black and to a rubber composition containing such composite as a methylene donor in combination with a methylene acceptor and the reaction product thereof in situ within said rubber composition. Such rubber composition may be a component of an article of manufacture, which may contain or be exclusive of, wire reinforcement, such as for example a component of a tire, vehicular track or industrial belt or hose.

4 Claims, No Drawings

COMPOSITE OF MELAMINE DERIVATIVE AND CARBON BLACK, RUBBER COMPOSITION AND ARTICLE HAVING A COMPONENT THEREOF

The Applicants hereby incorporate by reference prior U.S. Provisional Application Ser. No. 60/381,232, filed on May 17, 2002.

FIELD OF THE INVENTION

This invention relates to a composite of a melamine derivative, particularly a liquid melamine derivative, and carbon black. A representative melamine derivative is, for example, comprised of an alkoxymethylmelamine such as hexamethoxymethylmelamine. The invention further relates to a rubber composition containing such composite of a melamine derivative and carbon black and to a rubber composition containing such composite as a methylene donor in combination with a methylene acceptor and the reaction product thereof in situ within said rubber composition. Such rubber composition may be a component of an article of manufacture, which may contain or be exclusive of, wire reinforcement, such as for example a component of a tire, vehicular track or industrial belt or hose.

BACKGROUND OF THE INVENTION

Various melamine derivatives, as methylene donors, in combination with a methylene acceptor, have been reported for use in forming resin networks, usually in situ, within various rubber compositions to aid, for example, adhesion of the rubber to wire reinforcement. Various of such recited melamine derivatives have been, for example, hexamethoxymethylmelamine (HMMM) and hexaethoxymethylmelamine and N-(substituted oxymethyl) melamine derivatives such as hexakis (methoxymethyl) melamine, N,N',N"-trimethyl-N,N',N"-trimethylolmelamine, hexamethyolmelamine, N,N',N"-trimethylolmelamine, N-methylolmelamine, N,N'-dimethylolmelamine, N,N',N"-triethyl-N,N',N"-tris(methoxymethyl) melamine and N,N',N"-tributyl-N,N',N"-trimethylolmelamine.

It is important to appreciate that such melamine derivatives used as methylene donors are often not used in a high purity form and are often a mixture of melamine derivatives. For example, hexamethoxymethylmelamine (HMMM) may actually be a mixture of tetra-, penta-, hexa-OCH$_2$—, and hexa-methoxymethylmelamines and dimers thereof of which the HMMM may typically be the largest individual melamine derivative, or perhaps a major individual melamine derivative in such mixture. For example, the mixture itself may be comprised of from about 25 to about 70 percent HMMM with the remainder comprised primarily of the aforesaid variant melamine derivatives. Thus, while a specific melamine derivative (e.g. the HMMM) may be referred to herein, it is most likely comprised of a blend of melamine derivatives so that a composite or a rubber composition referenced as containing a specific melamine derivative may often more properly be referred to as being comprised of such specified melamine derivative.

Various of reported methylene acceptors have been, for example, resorcinol, phenols, or substituted phenols such as p-isopropylphenol, p-cresol and 4-(p-methyl)phenol, N-(3-hydroxyphenyl) meleamic acid and N-(4-hydroxyphenyl) meleamic acid, phenolic cashew nut oil resin, resorcinol monobenzoate and polyhydric phenoxy resin.

Pre-formed composites of carbon black and various rubber compounding ingredients have heretofore been referred to, for example, to in U.S. Pat. No. 6,053,226 which relates to providing a pre-formed composite of carbon black and rubber compounding ingredient(s), particularly liquid rubber compounding ingredient(s) for use in various rubber compositions. Such rubber compounding ingredients are recited, for example, as liquid coupling agents (liquid bis (trialkoxysilylalkyl) polysulfides), microcrystalline waxes, antiozonants, antioxidants, vulcanization accelerators, and vulcanization inhibitors, and liquid rubber compounding ingredients in *The Vanderbilt Rubber Handbook*, Thirteenth Edition, 1990, Pages 295 through 395.

In practice, however, liquid melamine derivatives are considered herein difficult to utilize in a commercial rubber manufacturing operation, particularly for use as a combination of a melamine derivative based methylene donor and a methylene acceptor to form a reinforcing resin network within a rubber composition because of inherent processing difficulties relating to mixing the liquid with rubber together with other rubber compounding ingredients in a rubber mixer such as an internal rubber mixer.

Accordingly, it is proposed in this invention to provide such liquid melamine derivative based compound as a particulate, preferably free flowing, pre-formed composite of carbon black and said melamine derivative for use in blending with a rubber composition, particularly as a methylene donor in combination with an addition of a methylene acceptor to the rubber composition to form a reaction product thereof as a resin network in situ within the rubber composition. It is considered herein the carbon black component of the composite may, in part, be incorporated within the in situ formed resin network within the rubber composition.

In the description of this invention the term "phr" refers to parts by weight of an ingredient phr per 100 parts by weight of rubber. The term "rubber" and "elastomer" where used, are interchangeable unless otherwise indicated. The terms "vulcanized" and "cured", if used, are interchangeable unless otherwise indicated.

SUMMARY AND PRACTICE OF THE INVENTION

In accordance with this invention, a composite of carbon black and melamine derivative is provided.

Said melamine derivative is preferably comprised of at least one of hexamethoxymethylmelamine, tetramethoxymethylmelamine, pentamethoxymethylmelamine, hexaethoxymethylmelamine, and dimers thereof; and hexakis (methoxymethyl) melamine, N,N',N"-trimethyl-N,N',N"-trimethylolmelamine, hexamethylolmelamine, N,N',N"-trimethylolmelamine, N-methylolmelamine, N,N'-dimethylolmelamine, N,N',N"-triethyl-N,N',N"-tris (methoxymethyl) melamine and N,N',N"-tributyl-N,N',N"-trimethylolmelamine.

In practice, as herein before mentioned, said melamine derivative is often a mixture of melamine derivatives such as, for example where it is desired that a hexamethoxymethylmelamine derivative be used, it may be comprised of tetramethoxymethylmelamine, pentamethoxymethylmelamine, hexamethoxymethylmelamine, and dimers thereof.

Preferably, said melamine derivative is a liquid melamine derivative comprised of hexamethoxymethylmelamine or hexaethoxymethylmelamine, and their mixtures, and particularly comprised of hexamethoxymethylmelamine In further accordance with this invention, a vulcanizable rubber composition is provided comprising an unvulcanized rubber, vulcanizing agent for said rubber and a pre-formed carbon black composite (pre-formed composite prior to blending thereof with the rubber) of carbon black and at least one of said melamine derivatives.

In additional accordance with this invention, a vulcanizable rubber composition is provided comprising an unvulcanized rubber, vulcanizing agent for said rubber and the reaction product of a methylene donor as at least one of said melamine derivatives of said carbon black composite and a methylene acceptor. Such reaction product is typically a resin. Various methylene acceptors may be used. The term "methylene acceptor" is used to indicate a compound having a capability or reacting with the methylene provided by said melamine derivative in situ within the rubber composition and is well known to those having skill in such art. For examples of use of melamine derivatives as methylene donors and various methylene acceptors for a rubber composition see, for example, U.S. Pat. Nos. 3,517,722, 4,338,263, 4,339,359, 4,436,853, 4,605,696, 5,194,513, and 6,269,858.

Exemplary of various methylene acceptors are, for example and not intended to be limiting, resorcinol, resorcinol monobenzoate, resorcinol rosinate, phloroglucinol mono-rosinate, phenolic cashew nut oil resin, and polyhydric phenoxy resin, preferably selected from resorcinol, phenolic cashew nut oil resin and polyhydric phenoxy resin.

For representative examples of phenolic cashew nut oil resins and polyhydric phenoxy resins, see U.S. Pat. Nos. 5,206,289 and 4,605,696.

For said pre-formed carbon black composite, the weight ratio of melamine derivative to carbon black may be, for example, in a range of about 0.05/1 to about 0.9/1, depending somewhat upon the ability of the carbon black to absorb, or otherwise form a respective composite with, a respective melamine derivative.

The term "composite" of carbon black, and melamine derivative is to be distinguished from a simple, aggregate, mixture thereof. In practice, such composite may be prepared, for example, by mixing a liquid melamine derivative with carbon black (e.g. at a temperature in a range of about 20° C. to about 40° C.), melting a solid melamine derivative and mixing it in its liquid form with a carbon black, or dissolving a melamine derivative in a suitable solvent to form a solution thereof, mixing the solution with carbon black and removing the solvent, all to form a composite thereof by allowing the melamine derivative itself to form a composite with the carbon black.

In one aspect of the invention, at least a portion of the rubber is a sulfur vulcanizable diene-based elastomer and the vulcanization agent is sulfur.

Accordingly, in such aspect of the invention, the rubber composition is sulfur cured, or vulcanized.

Where the rubber is comprised of a butyl rubber (e.g. copolymer of isobutylene and minor amount of isoprene), halogenated butyl rubber (e.g. chlorobutyl or bromobutyl rubber) or EPDM (ethylene/propylene/non-conjugated diene such as for example 1,4-hexadiene or ethylidene norbornene) terpolymer, a peroxide curative may be used. Thus, such rubber composition would be peroxide cured, a curing process well known to those having skill in such art.

In further accordance with this invention, an article of manufacture is provided having at least one component comprised of a rubber composition containing said carbon black-based composite of carbon black and melamine derivative. In additional accordance with this invention, an article of manufacture is provided having at least one component of a rubber composition comprised of a reaction product of a methylene donor as said melamine resin contained in said carbon black composite and a methylene acceptor.

In further accordance with this invention, said article of manufacture is a tire. Representative components, comprised of the rubber composition, thereof are, for example, a tire tread, tire apex (e.g. in the sidewall of a tire adjacent to a tire bead), tire sidewall insert (e.g. in the sidewall of a tire spaced apart from the tire bead), tire chafer, and a tire bead rubber composition (e.g. a rubber composition encapsulating the tire bead wires).

It is particularly desired for such tire components which comprise rubber coated, or encapsulated, steel wire reinforced components, particularly brass coated steel wire reinforcement, wherein said wire reinforcement is coated, or encapsulated with the rubber composition of this invention.

The rubber composition is also desired for rubber-based components which do not contain, or are exclusive of, wire reinforcement where the resin product of the melamine derivative as a methylene donor and the methylene acceptor act to enhance the stiffness of the rubber component, and therefore in the nature of a rubber stiffener.

For a vehicular track, designed to encompass a drive wheel and one or more guide wheels, which contains drive, or guide, lugs designed to engage said drive wheel, the rubber composition of this invention may be used as a component of such track in the nature of said drive lugs to add stiffness to said lugs which are not wire reinforced.

As will be hereinafter discussed, it is understood that additional conventional compounding ingredients are mixed with the prescribed materials for the described method to provide a rubber composition. Such ingredients typically include materials such as zinc oxide, stearic acid, optional processing oils and waxes, antidegradants, as well as curatives which include sulfur and vulcanization accelerators. The assembly of components is molded and vulcanized under conditions of elevated temperature in a suitable mold to ultimately produce the respective product. This would be well understood by one having skill in such art upon becoming acquainted with this invention.

Sulfur vulcanizable diene-based elastomers may be homopolymers and copolymers of conjugated dienes such as isoprene and 1,3-butadiene and copolymers of such dienes with a vinyl aromatic compound such as styrene and/or alphamethylstyrene, preferably styrene.

Accordingly, such elastomers may be, for example, cis 1,4-polyisoprene whether natural or synthetic, 3,4-polyisoprene, cis 1,4-polybutadiene, trans 1,4-polybutadiene, high vinyl polybutadiene having about 35 to about 95 percent vinyl 1,2-content, isoprene/butadiene copolymers, butadiene/styrene copolymers, and styrene/isoprene/butadiene terpolymers.

The rubber composition, particularly diene rubber based rubber compositions, may be compounded by one having skill in such art. For example, reinforcing fillers may be added, and conventionally are added, to the rubber composition such as for example, carbon black (in addition to said carbon black composite of this invention) and/or amorphous silica, particularly precipitated silica, depending somewhat upon the desired properties and purpose of the rubber composition. Often a coupling agent is used to aid in coupling the silica to the rubber, particularly a diene-based rubber. Typical amounts of tackifier resins, if used, comprise about 0.5 to about 10 phr, usually about 1 to about 5 phr. Typical amounts of processing aids comprise about 1 to about 80 phr. Such processing aids can include, for example, aromatic, naphthenic, and/or paraffinic processing oils or plasticizer or low softening point polyethylene ether glycols. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1990), Pages 343 through 362. Typical amounts of antiozonants comprise about 1 to 5 phr. Typical amounts of fatty acids, if used, which can include stearic acid comprise about 0.5 to about 4 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. An antioxidant may be, for example, of the paraphenylene diamine and/or dihydro-trimethylquinoline type.

Representative carbon blacks for use in this invention are, for example, rubber reinforcing carbon blacks illustrated in *The Vanderbilt Rubber Handbook* (1990), Page 417.

Where the vulcanization is conducted in the presence of a sulfur vulcanizing agent, examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about one to about 2.5 often being preferred.

Where the curing of the rubber composition is to be conducted in the presence of a peroxide curing agent, examples of peroxide curatives include, for example, dicumyl peroxide although other peroxide-based curatives may be used which are well known to those having skill in such art.

The following discussion, however, is primarily directed to the sulfur curing of a rubber composition, particularly a diene rubber based rubber composition.

For the sulfur curatives, accelerators are used to control the time and/or temperature required for vulcanization and to improve the properties of the vulcanizate. Retarders are also used to control the vulcanization on-set. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and/or a secondary accelerator might be used, with the secondary accelerator being used in amounts of about 0.05 to about 3 phr, for example, in order to activate the cure and to improve the properties of the vulcanizate. Suitable types of accelerators that may be used in the present invention are, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The selection and amounts of the various compounding ingredients are not considered to be critical for the purposes of this invention, except where they may be especially emphasized elsewhere in this description, and can be adjusted or modified by the practitioner as deemed suitable for the desired rubber properties.

The article of manufacture can be built, shaped, molded and cured by various methods which known or apparent to those having skill in such art.

The rubber composition, or compound, for the article of manufacture may be prepared, for example, by mixing the ingredients in several sequential non-productive stages, without the sulfur (vulcanizing agent) and associated accelerator(s) to a temperature, for example, of about 165° C. followed by a final productive mixing stage to a temperature, for example, of about 105° C. in which the sulfur (vulcanizing agent) is added. An internal rubber mixer is usually preferred for such mixing steps. The resulting rubber composition may then be applied, possibly after extrusion to form a shaped component, to form the article of manufacture and the resulting assembly thereof vulcanized in a suitable mold at a temperature of, for example, about 150° C.

While certain representative embodiments and details have been shown for the purpose of illustrating the invention, it will be apparent to those skilled in this art that various changes and modifications may be made therein without departing from the spirit or scope of the invention.

What is claimed is:

1. A vulcanizable rubber composition comprising a blend of unvulcanized rubber, vulcanizing agent for said rubber, methylene donor and methylene acceptor wherein said methylene donor is a liquid melamine derivative and wherein said methylene donor is in a form of a pre-formed, particulate composite of said liquid methylene derivative and carbon black;
   wherein said methylene acceptor is selected from at least one of resorcinol, resorcinol monobenzoate, resorcinol rosinate, phloroglucinol mono-rosinate, phenolic cashew nut oil resin, and polyhydric phenoxy resin;
   wherein said pre-formed methylene donor composite is comprised of carbon black and melamine derivative with a weight ratio of said melamine derivative to carbon black in a range of about 0.05/1 to about 0.9/1;
   wherein said melamine derivative is comprised of at least one of hexamethoxymethylmelamine and hexaethoxymethylmelamine, and their mixtures.

2. The composition of claim 1 where said melamine derivative is comprised of hexamethoxymethylmelamine.

3. The composition of claim 1 where said unvulcanized rubber is comprised of at least one butyl rubber, halobutyl rubber and EPDM and mixtures thereof, where said vulcanizing agent is a peroxide vulcanizing agent for such rubber and where said rubber composition is vulcanized.

4. The composition of claim 1 where said methylene acceptor is selected from resorcinol, phenolic cashew nut oil resin and polyhydric phenoxy resin and mixtures thereof.

* * * * *